(12) United States Patent  
Vargantwar et al.

(10) Patent No.: US 8,254,331 B2  
(45) Date of Patent: Aug. 28, 2012

(54) METHOD AND SYSTEM FOR MANAGING HANDOFF IN A RADIO ACCESS NETWORK

(75) Inventors: Sachin R. Vargantwar, Overland Park, KS (US); Bhagwan Khanka, Lenexa, KS (US); Manoj Shetty, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 622 days.

(21) Appl. No.: 12/414,934

(22) Filed: Mar. 31, 2009

(65) Prior Publication Data

US 2010/0246534 A1    Sep. 30, 2010

(51) Int. Cl.  
*H04W 4/00* (2009.01)  
*H04W 36/00* (2009.01)

(52) U.S. Cl. ........................... 370/331; 455/437

(58) Field of Classification Search ................ None  
See application file for complete search history.

(56) References Cited

U.S. PATENT DOCUMENTS

| | | | |
|---|---|---|---|
| 6,496,492 B1 * | 12/2002 | Zeng | 370/331 |
| 2006/0209821 A1 * | 9/2006 | Jung et al. | 370/389 |
| 2009/0010222 A1 * | 1/2009 | Jechoux | 370/331 |
| 2009/0163207 A1 * | 6/2009 | Randall et al. | 455/436 |
| 2009/0279507 A1 * | 11/2009 | Kanazawa et al. | 370/332 |

FOREIGN PATENT DOCUMENTS

| | | |
|---|---|---|
| EP | 1959703 | 8/2008 |
| WO | 0176162 | 10/2001 |
| WO | WO 0176162 A1 * | 10/2001 |

OTHER PUBLICATIONS

International Search Report and Written Opinion for corresponding application No. PCT/US10/026809 dated May 31, 2010.  
Salih Omer, "Using Intelligent Devices to solve Handover Problem in 3G Mobile Network," p. 1-4, 2003, No later than Dec. 2003.

* cited by examiner

*Primary Examiner* — Andrew Chriss

(57) ABSTRACT

Disclosed is a method and device for managing handoff of an access terminal in a radio access network (RAN). An access terminal may detect a handoff trigger, determine whether there is an ongoing data transfer in progress, determine an amount remaining in the data transfer, compare the amount remaining to a threshold amount, and delay or cancel the handoff if the amount remaining is below the threshold amount. Additionally, the access terminal may consider signal strength of the current (source) coverage area in determining whether to delay or cancel the handoff.

21 Claims, 4 Drawing Sheets

METHOD AND SYSTEM FOR MANAGING HANDOFF IN A RADIO ACCESS NETWORK

BACKGROUND

In a typical radio access network (RAN), an area is divided geographically into a number of wireless coverage areas, such as cells and sectors, each defined by a radio frequency (RF) radiation pattern from a respective base transceiver station (BTS) antenna. The base station antennae in the cells are in turn coupled to a radio network controller (RNC), which is then coupled to a telecommunications switch or gateway, such as a mobile switching center (MSC) or packet data serving node (PDSN) for instance. The switch or gateway may then be coupled with a transport network, such as the PSTN or a packet-switched network (e.g., the Internet). An access terminal communicates with a BTS via an RF air interface. A communication path is thus established between the access terminal and the RAN.

One or more sectors may be defined by radiation patterns from directional-antenna components of a respective BTS, or by respective BTS antennae. These sectors (which can be visualized ideally as pie pieces) can be referred to as "physical sectors," since they are physical areas of a cell site. Therefore, at any given instance, an access terminal in a RAN will typically be positioned in a given physical sector and will be able to communicate with the transport network via the BTS serving that physical sector.

As an access terminal moves between coverage areas of the RAN, as network conditions change, or for any other reason, the access terminal may switch from receiving service in one coverage area to receiving service in another coverage area. In a usual case, this switching process is triggered by the access terminal monitoring the signal conditions in various available coverage areas of the RAN, and the access terminal and/or the RAN determining when one or more threshold criteria are met.

In one typical example, the access terminal may monitor signal strengths in various available sectors operating on the same air-interface protocol and then decide to switch to a new sector when the new sector has a signal strength that is sufficiently higher than the signal strength of the sector in which the access terminal is currently operating. The access terminal may then notify the RAN of its decision to switch sectors. In turn, the RAN may act upon the access terminal's request to switch sectors by ending service to the access terminal in the current sector and beginning service to the access terminal in the new sector. Handoff between sectors operating on the same air-interface protocol is defined as a horizontal handoff.

Additionally, an access terminal may determine that a new coverage area is capable of communicating with the access terminal on a different air-interface protocol, and may then request to switch to the different air-interface protocol, which may be offered by the same base transceiver station as the current air-interface protocol or by a different base transceiver station. For example, an access terminal may request handoff from an IS-2000 (e.g., 1xRTT) air-interface protocol offered by a first nearby base transceiver station to an IS-856 (EV-DO) air-interface protocol offered by a same or different base transceiver station. The coverage areas defined by the IS-2000 air-interface protocol and the IS-856 air-interface protocol may fully overlap, partially overlap, or not overlap at all. Handoff between coverage areas operating on different air-interface protocols is defined as a vertical handoff.

Overview

Currently, access terminals do not take into consideration ongoing transfers when determining whether to handoff to a new coverage area. These transfers could include file transfers or streaming media transfers. The term "data transfer" will be used to refer to either or both of a file transfer and a streaming media transfer.

Because of the failure to consider ongoing data transfers, handoff has become a notable factor in causing delayed or failed data transfers for access terminals operating in RANs. Access terminals increasingly use RANs to download and upload audio/video files from or to one or more devices in the RAN or on a packet-switched network accessible via the RAN. For example, an access terminal could obtain firmware updates or other system files via a file-transfer-protocol (FTP) connection with a firmware database maintained by a wireless service provider, or with an external firmware database maintained by a manufacturer of the access terminal, among other possibilities. Such firmware updates could provide for new features and/or improved reliability of the access terminal.

Access terminals may also be used to retrieve or send media files such as pictures, music, and/or movies from or to a media content server maintained by a wireless service provider or external entity on a packet-switched network accessible via the RAN, as examples. The media files may be transferred via a file-transfer protocol such as FTP, or may be transferred via one or more streaming-media protocols, among many other possibilities. And still other examples of content/file types, protocols, and network architecture could be used instead of or in addition to those described herein.

Modern access terminals are now being sold with processing and storage capabilities such that video and audio playback have become generally available across most access-terminal price points. Additionally, compression algorithms have advanced to enable transfer of high-fidelity digital audio files and high-quality image and digital video files at a fraction of their uncompressed size. Modern access terminals can thus be used to download high-quality audio tracks that a user may listen to via the access terminal. Similarly, an access terminal may be used to download high-quality pictures, videos, and/or movies that a user may view, listen to, or watch on the access terminal. Access terminals incorporating imaging devices such as cameras can capture images and upload them to, as examples, a remote server or to an e-mail server for delivery to a destination e-mail address. By providing the ability to use an access terminal as a full-featured personal media player and image-capture device, additional value can be provided to a user of the access terminal, and the number of electronic devices that a user must carry can be reduced.

In view of the recent increase in data-transfer operations to and from access terminals, wireless carriers are enhancing their network infrastructure to provide users with improved experiences transferring such files. Disclosed herein is an improved method and system for improving data transfers between radio access networks (RANs) and access terminals.

Currently, an access terminal does not take into consideration existing data-transfer operations when determining whether to handoff from a current coverage area (source coverage area) to a new coverage area (target coverage area). Accordingly, data transfers are regularly interrupted, and may be lost or delayed until service is provided to the access terminal in the target coverage area. If a connection is ultimately lost, an entire data transfer may have to be re-started, causing increased loads on the RAN and access terminal due to the need to re-transfer at least some of the same file or stream to the access terminal. Alternatively, even if the connection is not lost, the RAN must process and route (perhaps retransmitted) data packets sent between a content server and the access terminal until the connection between the content server and access terminal is restored. Additionally, in cases where the connection is not lost, a RAN may transmit data packets from a content server to both the source coverage area and the target coverage area during a download data transfer in order to attempt to provide uninterrupted service to the access terminal. This duplicative routing of packets to more than one coverage area also results in increased RAN bandwidth usage and processing loads.

In order to help avoid the negative effects on a user's experience and on network loads, among other problems, an access terminal is provided with the capability to cancel handoff or delay handoff for a specified period of time or for an amount of time necessary to complete an ongoing data transfer. In one example, an access terminal may detect a handoff trigger to switch from a source coverage area to a target coverage area. Because of the overhead and potential disruption associated with a horizontal or vertical handoff while a data transfer is occurring, the access terminal may take the existence of an ongoing data transfer into consideration when processing the handoff trigger. By taking into account the existing data transfer, the access terminal can determine whether it would be more efficient to attempt to finish the ongoing data transfer despite the detection of a handoff trigger. If the access terminal decides that it would be more efficient to finish the ongoing data transfer, the access terminal can cancel or delay the handoff.

More specifically, an access terminal may first detect a handoff trigger generated by the access terminal itself or provided to the access terminal by the RAN. Responsive to detecting the handoff trigger, the access terminal may determine whether it is currently involved in any ongoing data transfers. If there is an ongoing data transfer, the access terminal may then determine whether to continue with the handoff to the target coverage area and risk interruption of the ongoing data transfer, or to rather cancel or delay the handoff to avoid interruption of the ongoing data transfer.

In determining whether it would be more efficient to cancel or delay a handoff, the access terminal may consider such parameters as a current amount of data remaining to be transferred, the amount of data already transferred, signal strength in the source and/or target coverage areas, the current load on the radio access network (in the source and/or target coverage areas), and/or any other parameters that may have an impact on the determination to handoff.

As a specific example, an access terminal could consider whether an amount of data remaining to be transferred, or an amount of time remaining in the data transfer, is below a threshold value. The threshold value may be a hard-coded parameter or may be updateable by a user or by the RAN, among other options. In the event that a total data size or duration is known, and the amount already transferred is known, the access terminal can determine the amount of data remaining and compare the amount of data remaining to the threshold value.

If the remaining amount is below the threshold value, the access terminal may also determine whether the signal strength from the current coverage area is sufficient to maintain a reliable connection with the access terminal. For example, the access terminal could compare the existing signal-to-interference-plus-noise ratio (SINR) to a threshold SINR to determine whether the signal from the source coverage area is strong enough to support continued use of the signal from the source coverage area instead of handing off to a target coverage area.

If the access terminal determines that the remaining amount to be transferred is below the threshold remaining value, and that the signal strength from the source coverage area is above a threshold signal-strength level, the access terminal may determine that it should not handoff from the source coverage area to the target coverage area, or at least that it should not do so right now. The access terminal may effectuate this determination by, for example, simply ignoring or canceling the handoff trigger, by delaying the handoff trigger for a predetermined period of time, or by delaying processing of the handoff trigger until the ongoing data transfer is completed. Other handoff-canceling and/or handoff-delaying responsive actions and in actions are possible as well.

Once the ongoing data transfer is completed, the access terminal may process the previously asserted handoff trigger, may reassess whether a handoff is needed, or may continue using the current coverage area until a new handoff trigger is detected (e.g., generated, received, etc.). Other possibilities exist as well.

These as well as other aspects and advantages will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be used, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

a. Overview of Network Architecture

Figure 1:
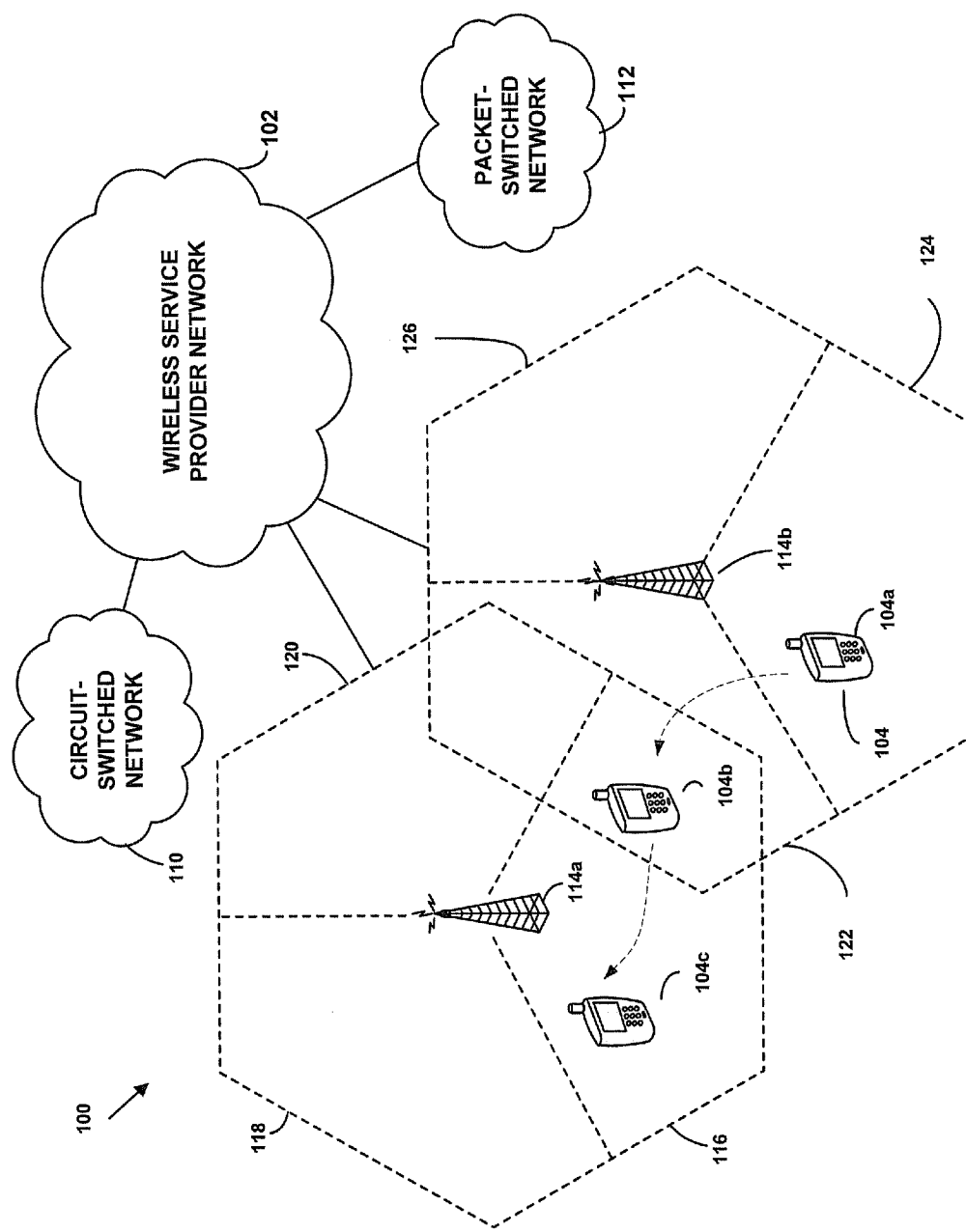
FIG. 1 is a simplified block diagram of a communication system in which exemplary embodiments can be implemented.

Referring to the drawings, FIG. 1 is a simplified block diagram of a communications system 100 in which an exemplary method can be implemented. As shown, the system 100 includes wireless service-provider network 102, access terminal 104, a circuit switched-network 110, a packet-switched network 112, BTSs 114, and one or more coverage areas 116-126.

The network 102 may provide connectivity between an access terminal 104 such as a cell phone, PDA, or other wirelessly-equipped device, and one or more transport networks, such as the circuit-switched network 110 (e.g., the public switched telephone network (PSTN)) or the packet-switched network (e.g., the Internet) 112.

Although not shown in FIG. 1, the wireless service provider network 102 may include one or more RNCs, one or more MSCs, and/or one or more PDSNs. Additional and/or different devices could also be used by network 102 to connect an access terminal 104 to other networks.

An RNC may function to communicate with each BTS 114 and control aspects of the BTSs 114 as well as aspects of air-interface communications with access terminal 104. For example, the RNC may control assignment of air-interface traffic channels to the access terminal 104. As another example, the RNC may control aspects of the access terminal 14 switching between sectors and/or cells. As yet another example, the RNC may facilitate communication between BTSs 114, such as communication between the first BTS 114a and the second BTS 114b. Other examples are possible as well. Although not shown in FIG. 1, it should be noted that an RNC and one or more BTSs 114 may be incorporated into a single entity.

An MSC may provide connectivity between an access terminal 104 and the circuit-switched network 110. Further, the PDSN may provide connectivity between an access terminal 104 and the packet-switched network 112. In this respect, wireless service provider network 102 may additionally include a packet control function (PCF) for controlling packet-data communications. Accordingly, with this general arrangement, wireless service provider network 102 may facilitate communications between two access terminals, as well as communications between a given access terminal 104 and a communication device on the circuit-switched network 110 and/or the packet-switched network 112.

The communications system 100 may further include a plurality of BTSs 114, such as a first BTS 114a and a second BTS 114b. (Although FIG. 1 depicts the communications system 100 as including two BTSs, it should be understood that the communications system 100 may include more than two BTSs). The BTSs 114 may each be any entity that facilitates communication between an access terminal 104 and the wireless service provider network 102. In this respect, the BTSs 114 may each function to transmit and receive RF-radiation patterns at one or more carrier frequencies, and the RF-radiation patterns may then provide one or more air interfaces over which an access terminal 104 may communicate with the provider network 102. For example, each BTS 114 may transceive omni-directional RF-radiation patterns that provide a single air interface. Alternatively, each BTS 114 may transceive directional RF-radiation patterns that provide multiple air interfaces. For example, in FIG. 1, the BTS 114a may transceive RF-radiation in three directions to form a first coverage area sector 116, a second coverage area sector 118, and a third coverage area sector 120. The BTS 114b transceives RF-radiation in three directions to form a first coverage area sector 122 (that overlaps the first coverage area sector 116 of BTS 114a), a second coverage area sector 124, and a third coverage area sector 126. Each BTS 114 may provide one or more air interfaces in each of the coverage area sectors 116-126.

Each air interface of a given BTS 114 in a given sector, such as sector 116, may also define a corresponding wireless coverage area. For example, if the first BTS 114a were to provide a single omni-directional air interface, then the first BTS 114a may serve a single wireless coverage area (e.g., a cell). Alternatively, if the first BTS 114a provides two air interfaces in each of sectors 116, 118, and 120, the first BTS 114a would provide six wireless coverage areas. By extension, the number of coverage areas provided by a given BTS is a function both of hardware and carrier allocation.

Together, the BTSs 114 and wireless service provider network 102 defines a radio access network (RAN) that allows an access terminal 104 to communicate with other access terminals 104 and/or with one or more devices in the circuit-switched network 110 and/or with one or more devices in the packet-switched network 112.

The air interfaces of the BTSs 114 may carry communications between the RAN and the access terminal 104 according to any one or more of a variety of protocols. For example, the air interfaces may carry communications according to CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces may also be divided into a plurality of channels for carrying different types of communications between the RAN and the access terminal 104. For example, each air interface may include forward-link channels (e.g., control channels, forward-traffic channels, etc.) for carrying forward-link communications from the RAN to the access terminal 104, as well as reverse-link channels (e.g., access channels, reverse-traffic channels, etc.) for carrying reverse-link communications from the access terminal 104 to the RAN. In a preferred example, access terminal 104 will communicate with the RAN according to an IS-856 protocol (e.g., Evolution-Data Optimized (EV-DO)), such as IS-856 Rel. 0 or IS-856 Rev. A.

At any one time, an access terminal 104 may request and receive service from the RAN in a "serving" coverage area (and thus from a particular BTS on a particular air interface), which the access terminal 104 may select from the available nearby coverage areas. In some cases, the access terminal may select more than one nearby coverage area at a time. To facilitate this selection process, the access terminal 104 may monitor signal conditions (e.g., carrier-to-interference (C/I) ratio and/or a signal-to-interference-plus-noise ratio (SINR)) for a plurality of coverage areas detected by the access terminal 104. The access terminal 104 may then select, request, and receive service in the coverage area with the best signal conditions (i.e., the "strongest" coverage area). For any number of reasons, including a reduction in signal strength, for example, an access terminal 104 may decide to switch to a different coverage area. In this respect, the access terminal 104 may notify the RAN of its decision to switch to a new coverage area. Alternatively, and for any number of reasons, including load-balancing reasons, the RAN may instruct the access terminal 104 to switch to a new coverage area. In either event, the RAN may function to handoff service of the access terminal 104 from the current coverage area (the source coverage area) to a new coverage area (the target coverage area).

The process of the access terminal 104 notifying the RAN of a coverage-area switch and the RAN responsively handing off service to the target coverage area may occur in a variety of ways. In one example, an IS-856 access terminal 104 may use a first reverse-link channel, known as a "data rate control" (DRC) channel, to notify the RAN of a coverage area switch.

For example, in response to deciding to switch from a source sector to a target sector, the access terminal 104 requesting data in the source sector may simultaneously notify the RAN of the sector switch and begin requesting data in the target sector by sending the RAN one or more DRC-channel transmissions that indicate the target sector. In response to receiving the one or more DRC-channel transmissions that indicate the target sector, the RAN may then stop sending data to the access terminal 104 in the source sector and begin sending data to the access terminal 104 in the target sector.

If the source coverage area and the target coverage area are served by different BTSs 114, however, the BTS 114 in the target coverage area may first need to prepare to serve the access terminal 104 in the target coverage area. An IS-856 access terminal 104 may use a second reverse-link channel, known as a "data source control" (DSC) channel, to provide the RAN with advance notification of a switch to a target coverage area served by a different BTS 114a, thus allowing the RAN to prepare to serve the access terminal 104 via the BTS 114a while continuing to serve the access terminal 104 via the BTS 114b.

For example, in response to deciding to switch from a source sector 116 served by a first BTS 114a to a target sector 122 served by a second BTS 114b, an access terminal 104 requesting data in the source sector of the first cell may notify the RAN of the sector switch by sending a first DSC-channel transmission that indicates the target sector 122. While sending the first DSC-channel transmission that indicates the target sector 122, the access terminal 104 may also continue sending, and the RAN may continue receiving, DRC-channel transmissions that indicate the source sector 116. As such, the access terminal 104 may continue receiving data in the source sector 116 while the BTS 114b prepares to serve access terminal 104 in the target sector 122. Once the access terminal 104 has finished sending the first DSC-channel transmission that indicates the target sector 122, the access terminal 104 may then begin requesting data in the target sector 122 by sending one or more DRC-channel transmissions that indicate the second BTS 114b, and more particularly the target sector 122.

b. Exemplary Access Terminal Device Structure

Figure 2:
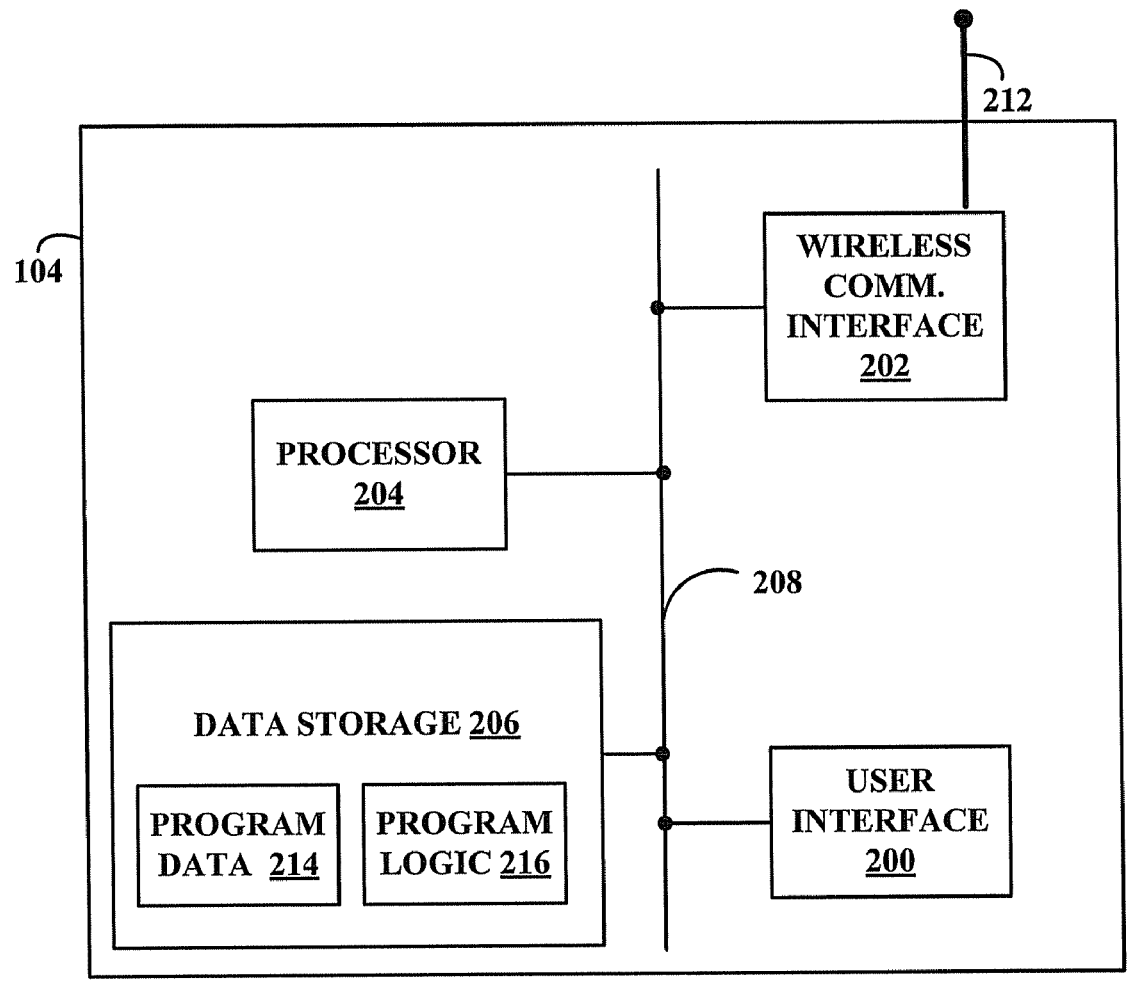
FIG. 2 is a simplified block diagram of an exemplary access terminal.
Figure 3:
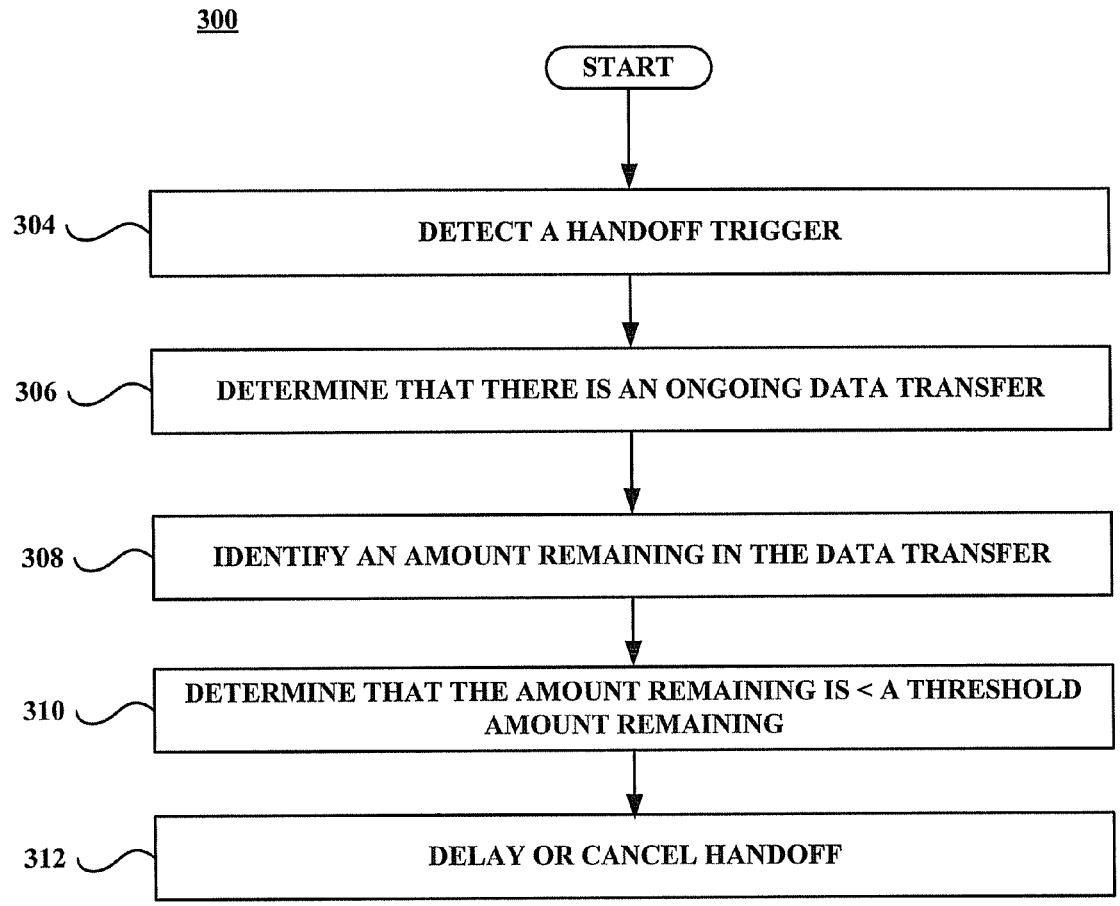
FIG. 3 is a flow-chart depicting a first exemplary method of operation of an access terminal in a radio access network.
Figure 4:
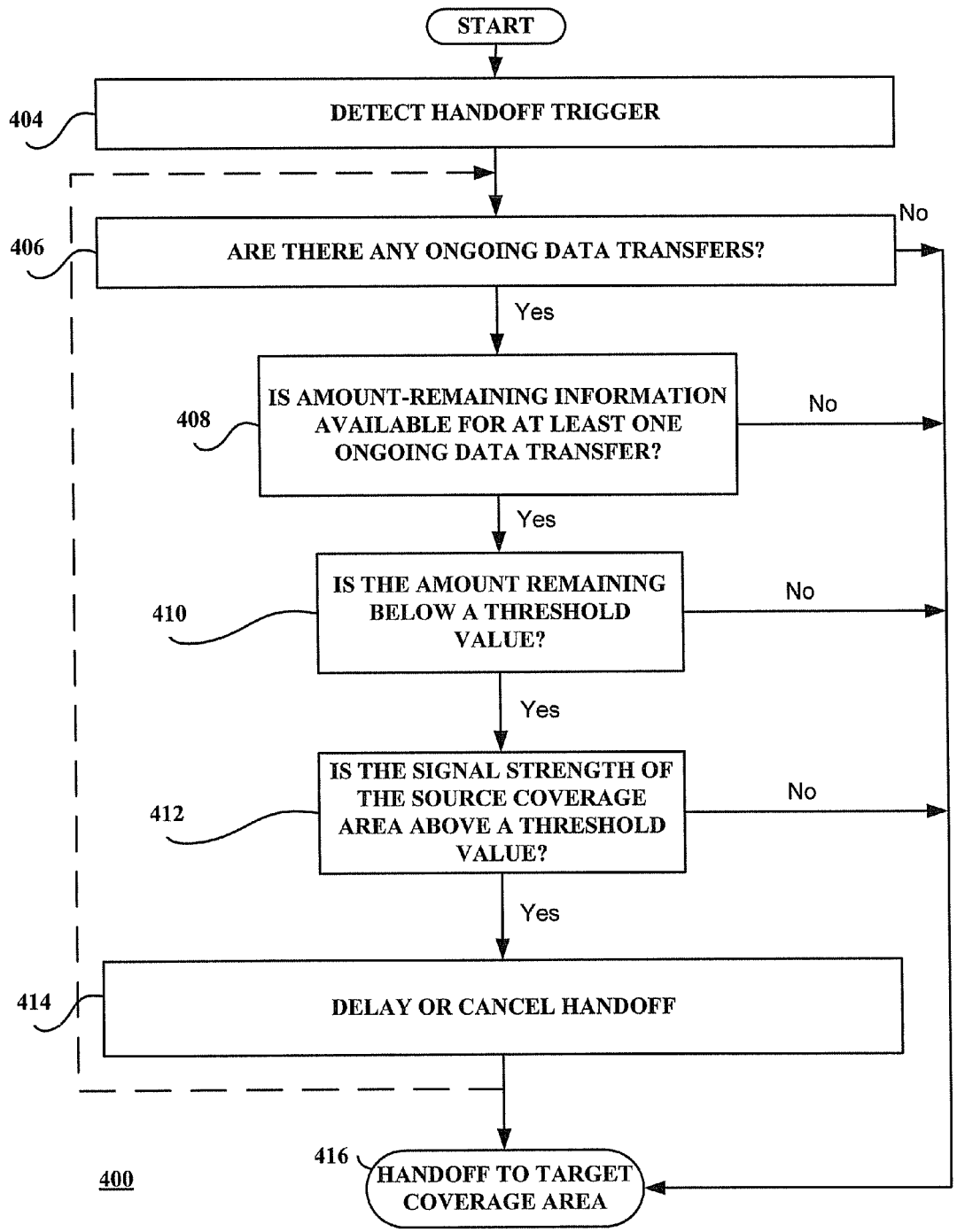
FIG. 4 is a flow-chart depicting a second exemplary method of operation of an access terminal in a radio access network.

FIG. 2 is a simplified block diagram showing functional components of an exemplary access terminal 104 capable of carrying out the exemplary methods of FIGS. 3-4. As shown in FIG. 2, the exemplary access terminal 104 may include a user interface 200, a wireless communication interface 202, a processor 204, and data storage 206, all linked together via a system bus, network, or other connection mechanism 208. An internal or external antenna 212 may be provided to aid in wireless communications with another device. The access terminal 104 may also include other elements.

Referring to FIG. 2, the user interface 200 preferably functions to facilitate user interaction with the exemplary access terminal 104. The user interface 200 may include a variety of input components, such as a touch screen, a navigation pad, a multi-functional button, a thumb wheel, a keyboard or keypad, and/or a microphone for instance. Additionally, the user interface 200 may include a variety of output components, such as a display screen and/or a speaker for instance. The user interface 200 may include signal processing components, such as A-D and D-A circuitry and other components for facilitating user interaction with the exemplary access terminal 104 as well.

The communication interface 202 preferably functions to communicatively couple the access terminal 104 to the RAN, and more particularly, to the BTSs 114. In this respect, the communication interface 202 will preferably facilitate forward-link and reverse-link communication with the BTSs 114. Further, the communication interface 202 will preferably support multiple channels on the forward-link and reverse-link, including a first reverse-link channel (e.g., a DRC channel) and a second-reverse link channel (e.g., a DSC channel).

The communication interface 202 may take the form of a chipset adapted to facilitate wireless communication according to a desired protocol (e.g., IS-856, EVDO, WiMax) and/or any other form that provides for wireless communication. The communication interface 202 may also include multiple communication interfaces, such as one with which the exemplary access terminal 104 sends reverse-link communications and one with which the exemplary access terminal 104 receives forward-link communications. Other configurations are also possible.

The processor 204 may comprise one or more general purpose microprocessors and/or dedicated signal processors. (The term "processor" encompasses either a single processor or multiple processors that could work in combination.) Data storage 206, in turn, may comprise any computer readable medium, including memory and/or other storage components, such as optical, magnetic, organic or other memory or disk/disc storage, which can be volatile and/or non-volatile, internal and/or external, and integrated in whole or in part with the processor 204. Data storage 206 preferably contains or is arranged to contain (i) program data 214 and (ii) program logic 216. Although these components are described herein as separate data storage elements, the elements could just as well be physically integrated together or distributed in various other ways. In one example, the program data 214 would be maintained in data storage 206 separate from the program logic 216, for easy updating and reference by the program logic 216. Additionally, the data storage 206, including any portion of program data 214 and/or program logic 216, may be stored in a removable computer readable medium that is detachable from the access terminal 104 and/or bus 208.

Program data 214 may contain information related to the first and second reverse-link channels. For example, program data 214 may contain an indication of a cell (and more particularly a sector) in which the exemplary access terminal 104 is currently requesting data (e.g., a DRC cover). As another example, program data 214 may contain an indication of a cell in which the exemplary access terminal 104 will be requesting data in the near future (e.g., a DSC cover), which the exemplary access terminal 104 may send via the second reverse-link channel.

Program data 214 may also contain information related to the sectors and/or cells in which the exemplary access terminal 104 has previously requested data. For example, program data 214 may contain an identifier of each sector and/or cell in which the exemplary access terminal 104 has recently requested data. As another example, program data 214 may contain an indication of a time period during which the exemplary access terminal 104 was requesting data in each recent sector and/or cell. Other examples are possible as well.

Program data 214 may contain a data threshold value of an amount of data transfer remaining that would cause an access terminal 104 to delay or cancel a handoff trigger so that an ongoing data transfer may finish prior to handoff from a source coverage area to a target coverage area. This threshold value could be a hardcoded value stored in static, non-volatile read-only memory, or could be an updatable value that is modifiable by a user and/or by the wireless service provider. The threshold value could be stored elsewhere, for example, in a data store separate from the program data 214 and program logic 216.

The stored threshold value could be based on a total amount of data remaining to be transferred, and could be in the range of 1 kilobyte (kB)-50,000 kilobytes (50 MB). Alternatively, the threshold value could be based on a time duration remaining until completion of the data transfer, and could be in the range of 1-60 seconds (s). Finally, the threshold value could be based on a percentage remaining until data-transfer completion, and could be in the range of 1-25%. Other possibilities exist as well.

Program logic 216 preferably comprises machine-language instructions that may be executed or interpreted by processor 204 to carry out functions in accordance with the exemplary methods described with regard to FIGS. 3-4, and elsewhere herein. Additionally, program logic 216 comprises machine-language instructions for initiating and managing file transfers with other devices, among other functions.

The access terminal 104 may be provided with a total data size or total duration of a data-transfer operation prior to the data transfer, or during the data transfer itself, in order to determine a transfer amount remaining. The total-data-transfer information may be provided at the beginning of or at some other point throughout the data-transfer process. For example, while the original File Transfer Protocol (FTP) based on RFC959 (1985) does not require that total-file-size information be provided, most FTP servers will provide the size of an upcoming transfer in response to a retrieve (RETR) command from a client device. Specifically, an FTP server will provide a return code 150 acknowledging a RETR command in the following (or similar) manner: "code=150, arg=Opening ASCII mode data connection for readme.txt (1715 bytes)." Accordingly, an FTP client device could parse the code 150 response and determine a total file size of the file being transferred even though such a response is not officially required by the RFC959 specification.

An updated FTP protocol based on RFC3659 provides for an explicit "size" command that allows a client to request an FTP server conforming to the new protocol to provide an exact number of octets (8 bit bytes) that would be transmitted over the data connection should the file indicated be transmitted to the client.

A video and/or audio streaming transfer application may provide a total file size or a total playback duration value for a video and/or audio stream being transferred to the access terminal 104. For example, although a bit rate between the access terminal 104 and source content server may vary, a video and/or audio streaming method may provide a total file duration that could be used by the access terminal 104 to determine an anticipated end-time for the streaming data transfer based on a time duration remaining instead of an actual data amount remaining.

As mentioned earlier, the term "data transfer" as used herein refers to either a file transfer or a streaming media transfer. Additionally, any other data transfer method could also be implemented via program logic 216, as long as the data transfer method provides some information from which an amount remaining may be determined.

It should be understood that the program logic 216 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware, or any combination thereof.

Now that the exemplary network architecture and data-transfer process have been explained, an improved method and system for managing handoff will be described.

c. Exemplary Handoff Operation

FIG. 3 is a flow-chart depicting an exemplary method 300 of handling handoff while an access terminal 104 is participating in an ongoing data transfer (file transfer or streaming operation). The ongoing data-transfer operation could be a download operation in which a file or stream operation is flowing in a general direction from the radio access network (RAN) to the access terminal 104 (e.g., with the exception of management frames, such as acknowledgement packets), or could be an upload operation in which a file or stream operation is flowing in a general direction from the access terminal 104 to the RAN. Other possibilities exist as well.

At step 304, the access terminal 104 detects a handoff trigger. The handoff trigger may be internally generated within the phone, or externally delivered to the phone by, for example, the RAN. An internally generated handoff trigger could be the result of the access terminal 104 determining that a stronger signal is available in a different coverage area than the signal currently being used. For example, as shown in FIG. 1, as the access terminal 104 moves from its position 104a in sector 124 to its position 104b or 104c in sector 116 of BTS 114a, the access terminal 104 may determine that a stronger signal is being provided by BTS 114a compared to BTS 114b, and an internal handoff trigger could be generated. The handoff trigger could be the assertion of a flag in a register contained within the access terminal 104, or could be the execution of a particular section of program code stored in program logic 216 that deals with handoffs. Other examples are possible as well.

The internally generated handoff trigger could also be the result of the access terminal 104 determining that a different air interface is available than the air interface currently being used. For example, as shown in FIG. 1, the access terminal 104 in position 104b may be in sector 116 and be receiving service via BTS 114a on an air interface, but may detect a higher-bandwidth air interface from BTS 114a, and may then initiate a vertical handoff to the higher-bandwidth air interface from the same BTS 114a. Other events may also generate a handoff trigger.

Additionally, an externally provided handoff trigger could be delivered to an access terminal 104 from the RAN, for example, for quality of service (QoS) reasons, in order to balance loads among one or more cells in the RAN, and/or one or more other reasons.

Returning again to FIG. 3, once an access terminal 104 detects a handoff trigger, it will determine at step 306 that there is an ongoing data-transfer operation. As noted above, the data-transfer operation could be a File Transfer Protocol (RFC959 or RFC3659) operation or an audio and/or video streaming operation.

At step 308, the access terminal 104 identifies an amount remaining in the data transfer. At step 310, the access terminal 104 will determine whether the amount remaining is below a corresponding threshold value. As noted above, one or more threshold values may be stored in program data store 214. The stored threshold value could be based on a total amount of data remaining to be transferred, and could be in the range of, for example, 1-50,000 kilobytes (kB). Alternatively, the stored threshold value could be based on a time duration remaining until completion of the data transfer, and could be in the range of 1-60 seconds (s). Finally, the threshold value could be based on a percentage remaining until completion, and could be in the range of 1-10%. Other possibilities exist as well.

For example, the stored threshold value may be 256 kB. The processor 204 may then retrieve the threshold value of 256 kB from the program data store 214 and compare it to an actual amount remaining for the current ongoing data transfer operation. Assuming that the current data transfer operation is an FTP (RFC959) file transfer, and the access terminal 104 was informed of the total file size of the file to be transferred prior to initiating data transfer, the access terminal 104 can determine an amount remaining (in bytes, kilobytes (kB), megabytes (MB), gigabytes (GB), or terabytes (TB), as examples) by subtracting an amount already transferred from the total file size. If the amount remaining is above the threshold value (in this case more than 256 kB), the access terminal 104 may proceed to initiate handoff to the target coverage area indicated in the handoff trigger. If, however, the amount remaining is below the threshold value, in this case below 256 kB, the access terminal 104 may proceed to step 312. The access terminal could be programmed to handle an event wherein the amount remaining is equal to the threshold value in any matter without departing from the spirit or scope of the invention.

Once the access terminal 104 determines that an ongoing data transfer should be finished instead of immediately handing off, the access terminal 104 will proceed to step 312 and delay or cancel the handoff.

A access terminal 104 could be configured to delay handoff every time at step 312. Alternatively, an access terminal 104 could also be configured to cancel the handoff every time at step 312. Finally, an access terminal 104 could choose from cancelling or delaying in a random manner, or intelligently based on other factors, perhaps including one or more network parameters.

If the access terminal 104 is configured to delay handoff in a particular instance, further processing of the handoff trigger may be delayed for a predetermined period of time, or for a period of time equal to the anticipated amount of time to finish the data transfer (plus perhaps an additional amount of time to cover small errors or slow-downs in data-transfer throughput). Other delay mechanisms are possible as well.

If the access terminal 104 is configured to cancel handoff in a particular instance, the handoff trigger could be simply ignored, or the handoff trigger could be de-activated by, for example, resetting a handoff trigger flag. Other methods are possible as well.

After executing step 312, the access terminal 104 could return to normal processing and possibly await the detection of a subsequent handoff trigger. Alternately, the access terminal 104 could return to step 306 to determine whether there are any remaining ongoing data transfers. If the access terminal 104 had delayed processing of the handoff trigger, it could process the delayed handoff trigger after the delay and handoff to the target coverage area indicated in the handoff trigger, or it could re-determine whether the target coverage area indicated in the handoff trigger is still the best coverage area to which to handoff. Other possibilities exist also.

Other methods of handling a handoff trigger are also possible. FIG. 4 sets forth an additional method 400. It should be noted that the methods 300 and 400 are not mutually exclusive, and that any possibility or permutation described with respect to one applies equally to the other.

The alternate method 400 of handling a handoff trigger is detailed in FIG. 4. In step 404, a handoff trigger is detected at an access terminal 104. In step 406, the access terminal 104 determines whether there are any ongoing data transfers occurring. In the flow structure of FIG. 4, a determination that there are no ongoing data transfers will result in execution at step 416 of handoff to the target coverage area.

If it is determined in step 406 that there is at least one ongoing transfer, then at step 408, the access terminal 104 determines whether amount-remaining information is available for at least one of the ongoing data transfers. If not, flow proceeds to step 416; if so, then at step 410, the access terminal 104 determines whether the amount remaining in the data transfer is below a corresponding threshold value (as examples, a data amount, a time duration, or percentage remaining).

If the answer at step 410 is No, flow proceeds to step 416; if it is Yes, however, then at step 412, the access terminal 104 determines whether the signal strength of the current coverage area (the source coverage area) is above a threshold value. The access terminal 104 may thus determine whether the signal being received from the source coverage area is strong enough to provide sufficient throughput to finish the ongoing data transfer operation in a sufficient period of time. To facilitate this analysis, the access terminal 104 may monitor signal conditions (e.g., carrier-to-interference (C/I) ratio and/or a signal-to-interference-plus-noise ratio (SINR)) to determine whether the signal strength is above a signal-strength threshold value. Other signal monitoring techniques could also be utilized.

As noted above, one or more threshold values may be stored in program data store 214. The signal-strength threshold value could represent a minimum decibel level considered sufficient for maintaining a certain level of throughput to finish the data transfer. For example, the threshold value may be a SINR of 8 dB, such that if the signal strength of the signal being received from the source coverage area is below 8 dB, the access terminal 104 will proceed to step 416 and initiate handoff to the target coverage area. On the other hand, if the SINR of the source coverage area signal is equal to or above 8 dB, the access terminal 104 proceeds to step 414. Other possibilities exist also.

It is important to note that the order of the above-described steps 406-412 is not critical, and may be reordered without departing from the spirit or scope of the invention. As examples, step 412 could be re-ordered to occur between steps 404 and 406, between steps 406 and 408, or between steps 408 and 410.

At step 414 of FIG. 4, similar to step 312 of FIG. 3, the access terminal 104 will delay or cancel handoff to the target coverage area. As shown by the dotted-line in FIG. 4, the access terminal may then loop back to step 406 to determine whether there are any additional ongoing data transfers. If there are no additional remaining ongoing data transfers, the access terminal 104 may proceed to step 416 and initiate handoff to the target coverage area.

In view of the foregoing methods, an access terminal 104 may delay or cancel handoff to a target coverage area, despite the detection of a handoff trigger, if an amount remaining of an ongoing data transfer is below a threshold value. The access terminal may also consider whether the signal strength of a source coverage area is sufficient to allow the access terminal 104 to complete the ongoing data transfer. Advantageously, by allowing the access terminal 104 to complete an ongoing data transfer prior to initiating handoff, the data transfer can complete the transfer more quickly and the user of the access terminal 104 can enjoy an enhanced experience using the service provider's network. Additionally, by allowing the access terminal 104 to finish an ongoing data transfer from a currently used BTS 114 before handing off, the processing load and bandwidth load on the RAN can be reduced. Specifically, by delaying or canceling handoff, the RAN does not need to send duplicative data to multiple BTSs 114 during a handoff in an attempt to ensure data continuity, and will not be subjected to processing and/or routing of duplicative packets as a result of data-transmission retries by a content source server during the temporary unavailability of the access terminal 104. Finally, the scenario can be prevented where a data connection between the access terminal 104 and a content source server is terminated because of the handoff and an entire data transfer process must be re-started from the beginning, causing additional bandwidth and processor load on the RAN.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of managing handoff of a wireless access terminal operating in a wireless network, comprising:
   a wireless access terminal detecting a handoff trigger while operating in a source coverage area, the handoff trigger indicating that the access terminal should handoff to a target coverage area;
   in response to detecting the handoff trigger, the access terminal:
   (i) determining that the access terminal has an ongoing data transfer;
   (ii) determining an amount of data remaining to be transferred in the data transfer by subtracting from a total size of the data transfer an amount of data transferred so far in the data transfer;
   (iii) determining that the determined amount of data remaining to be transferred in the data transfer is below a threshold amount; and
   (iv) responsive to determining that the amount of data remaining to be transferred in the data transfer is below the threshold amount, carrying out one of (a) delaying the handoff to the target coverage area and (b) cancelling the handoff to the target coverage area.

2. The method of claim 1, further comprising:
   the access terminal identifying a signal strength of the source coverage area; and
   the access terminal carrying out the one of (a) delaying the handoff to the target coverage area and (b) cancelling the handoff to the target coverage area only if the identified signal strength of the source coverage area is above a second threshold value.

3. The method of claim 1, wherein the access terminal carries out cancelling the handoff to the target coverage area.

4. The method of claim 1, wherein the access terminal carries out delaying the handoff to the target coverage area.

5. The method of claim 4, wherein the access terminal delays the handoff for a predetermined amount of time, after which time the access terminal determines whether to handoff to the target coverage area.

6. The method of claim 1, wherein the access terminal continues to operate in the source coverage area at least until the ongoing data transfer is completed.

7. The method of claim 1, wherein the data transfer is a file transfer.

8. The method of claim 7, wherein the file transfer is based on the File Transfer Protocol (FTP) protocol.

9. The method of claim 1, wherein the data transfer is at least one of an audio stream and a video stream.

10. The method of claim 1, wherein the threshold amount is an amount of data.

11. The method of claim 1, wherein the threshold amount is an amount of time.

12. A wireless access terminal comprising:
    a processor;
    data storage; and
    a wireless communications interface,
    wherein the processor is configured to detect a handoff trigger while operating in a source coverage area, the handoff trigger indicating that the access terminal should handoff to a target coverage area and, responsive to detecting the handoff trigger, determine that the access terminal has an ongoing data transfer, determine an amount of data remaining to be transferred in the data transfer by subtracting from a total size of the data transfer an amount of data transferred so far in the data transfer, determine that the determined amount of data remaining to be transferred in the data transfer is below a threshold amount, and, responsive to determining that the determined amount of data remaining to be transferred is below the threshold amount, carry out one of (a) delaying handoff to the target coverage area and (b) cancelling the handoff to the target coverage area.

13. The access terminal of claim 12, wherein the processor is further configured to identify a signal strength of the source coverage area, and to carry out the one of (a) delaying the handoff to the target coverage area and (b) cancelling the handoff to the target coverage area only if the identified signal strength of the source coverage area is above a second threshold value.

14. The access terminal of claim 12, wherein the processor is configured to carry out cancelling the handoff to the target coverage area.

15. The access terminal of claim 12, wherein the processor is configured to carry out delaying the handoff to the target coverage area.

16. The access terminal of claim 15, wherein the processor is further configured to, after delaying the handoff for a predetermined amount of time, determine whether to handoff to the target coverage area.

17. A computer program product, comprising a non-transitory computer readable medium having a computer readable program code embodied therein, said computer readable program code adapted to be executed to implement a method for managing handoff of a wireless access terminal in a wireless network from a source coverage area to a target coverage area, said method comprising:
    detecting a handoff trigger while operating in the source coverage area, the handoff trigger indicating that the access terminal should handoff to the target coverage area;
    in response to detecting the handoff trigger:
       determining that the wireless access terminal has an ongoing data transfer;
       determining an amount of data remaining to be transmitted in the data transfer by subtracting from a total size of the data transfer an amount of data transferred so far in the data transfer;
       determining that the determined amount of data remaining to be transferred is below a threshold amount; and
       responsive to determining that the amount of data remaining to be transferred is below the threshold amount, carrying out one of (a) delaying the handoff to the target coverage area and (b) cancelling the handoff to the target coverage area.

18. The computer program product of claim 17, wherein the computer program code is further adapted to identify a signal strength of the source coverage area, and to carry out the one of (a) delaying the handoff to the target coverage area and (b) cancelling the handoff to the target coverage area only if the identified signal strength of the source coverage area is above a second threshold value.

19. The computer program product of claim 17, wherein the computer program code is adapted to carry out canceling the handoff to the target coverage area.

20. The computer program product of claim 17, wherein the computer program code is adapted to carry out delaying the handoff to the target coverage area.

21. The computer program product of claim 17, wherein the computer program code is further adapted to, after the data transfer is completed, determine whether to handoff to the target coverage area.

* * * * *